(12) United States Patent
Houlbert (10) Patent No.: US 7,487,015 B1
(45) Date of Patent: Feb. 3, 2009

(54) EMULATOR FOR AN INERTIAL NAVIGATION UNIT PROTOCOL CONVERTER

(75) Inventor: Christian Lauritz Houlbert, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 275 days.

(21) Appl. No.: 11/527,664

(22) Filed: Sep. 21, 2006

Related U.S. Application Data (63) Continuation-in-part of application No. 11/499,983, filed on Jul. 31, 2006.

(51) Int. Cl.
*G01C 23/00* (2006.01)

(52) U.S. Cl. .................. 701/3; 701/4; 701/13; 701/14; 701/36; 701/211; 244/158.1; 340/995.27

(58) Field of Classification Search .............. 701/3, 701/4, 13, 14, 15, 35, 36, 200, 208, 211; 244/158.1; 340/995.27
See application file for complete search history.

(56) References Cited

U.S. PATENT DOCUMENTS

| 4,821,217 | A | * | 4/1989 | Jackson et al. | 701/3 |
| 5,377,109 | A | * | 12/1994 | Baker et al. | 701/14 |
| 6,072,571 | A | * | 6/2000 | Houlberg | 356/139.04 |
| 6,499,027 | B1 | * | 12/2002 | Weinberger | 707/4 |

* cited by examiner

*Primary Examiner*—Gertrude Arthur Jeanglaud
(74) *Attorney, Agent, or Firm*—David S. Kalmbaugh (57) ABSTRACT

An emulator, which is a computer program, for simulating 32 bit ARINC-429 data output by an Inertial Navigation System on board a P-3 aircraft. The value for each word output by the emulator is adjustable by user. The user adjusts each value by using the computer's mouse to engage slider controls located on a computer applications window. ARINC-429 data which the user adjusts includes aircraft latitude, longitude and altitude data as well as pitch and roll data for the aircraft, and time and distance to a destination by the aircraft.

20 Claims, 5 Drawing Sheets fig.1 fig.2

EMULATOR FOR AN INERTIAL NAVIGATION UNIT PROTOCOL CONVERTER

This application is a continuation-in-part of U.S. patent application Ser. No. 11/499,983, filed Jul. 31, 2006

BACKGROUND OF THE INVENTION

1. Field of the Invention

The present invention relates generally to the field of protocol converters. More specifically, the present invention relates to an emulator of an inertial navigation unit protocol converter on the P-3 aircraft.

2. Description of the Prior Art

The Department of Homeland Security utilizes airborne surveillance operations to monitor illegal activities which have an impact on national security. These activities include drug trafficking, illegal immigration, and terrorist activities.

Many ride-along sensor units often deployed with a surveillance P-3 aircraft require the implementation the National Marine Electronics Association 0183 (NMEA-0183) serial navigation data format. Future proposed components for geospatial video recording and reproduction also require the ability to utilize this format. There is currently an immediate need to provide aircraft navigation data in real time to produce a coherent video data stream for situational awareness during the transport of sensor video to the ground for analysis. The NMEA-0183 protocol provides a low bandwidth, commonly utilized format that end users can easily make use of for situational awareness.

An ARINC-429 to NMEA-0183 protocol converter was designed for use with the Litton LTN-92 Inertial Navigation System (INS), used on the P-3 aircraft, which is manufactured by Litton Industries, Incorporated. This protocol converter extracts commonly used parameters from the ARINC-429 protocol (such as time, date, position, ground speed and heading) and outputs a fixed set of NMEA-0183 sentences (such as RMB, RMC, GGA and GSA). The NMEA-0183 sentences provided by this protocol converter also provides pointing information that is used to indicate the location of an object relative to the P-3 aircraft. The protocol converter is described in co-pending U.S. patent application Ser. No. 11/499,983, which was filed Jul. 31, 2006.

However there is still a need for a device to bench test the protocol converter prior to the protocol converter deployment on a P-3 aircraft.

SUMMARY OF THE INVENTION

The present invention overcomes some of the disadvantages of the past including those mentioned above in that it comprises a relatively simple yet highly effective computer program for bench testing a protocol converter which converts ARINC-429 data from an inertial navigation system to NMEA-0183 data for transmission to a receiving station.

The present invention includes computer software which simulates the position, direction and velocity ARINC-429 data output by an inertial navigation system on board a P-3 aircraft. The software program performs two separate functions. The first function performed by the computer software is to process an action from the user when the user adjusts one of the slider controls appearing on a program created applications screen and then releases a mouse button after adjusting the slider control to a value selected by the user. The slider controls are used to adjust the values of the 32 bit ARINC-429 data words output to the ARINC-429 interface board of the protocol converter.

The second function performed by the software requires the software to generate the ARINC-429 data thread which includes each of the 32 bit ARINC-429 data words representing inertial navigation system data. The 32 bit ARINC-429 data words include altitude, latitude and longitude data for the P-3 aircraft, roll and pitch data for the P-3 aircraft and time and distance data to a destination.

DETAILED DESCRIPTION OF A PREFERRED EMBODIMENT OF THE INVENTION

Figure 1:
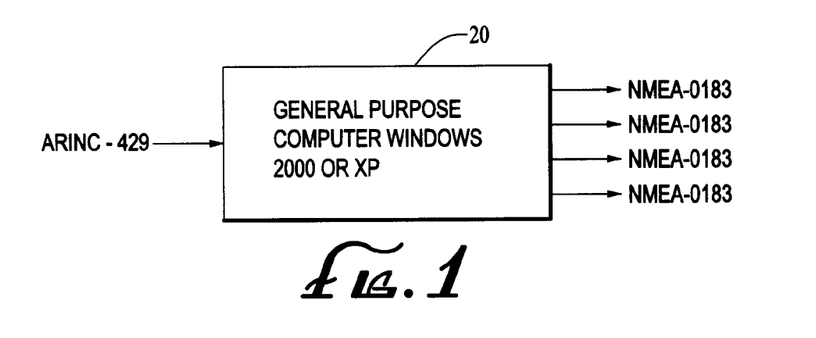
FIG. 1 illustrates a communications flow diagram for the inertial navigation unit protocol converter which the emulator comprising the present invention test.
Figure 2:
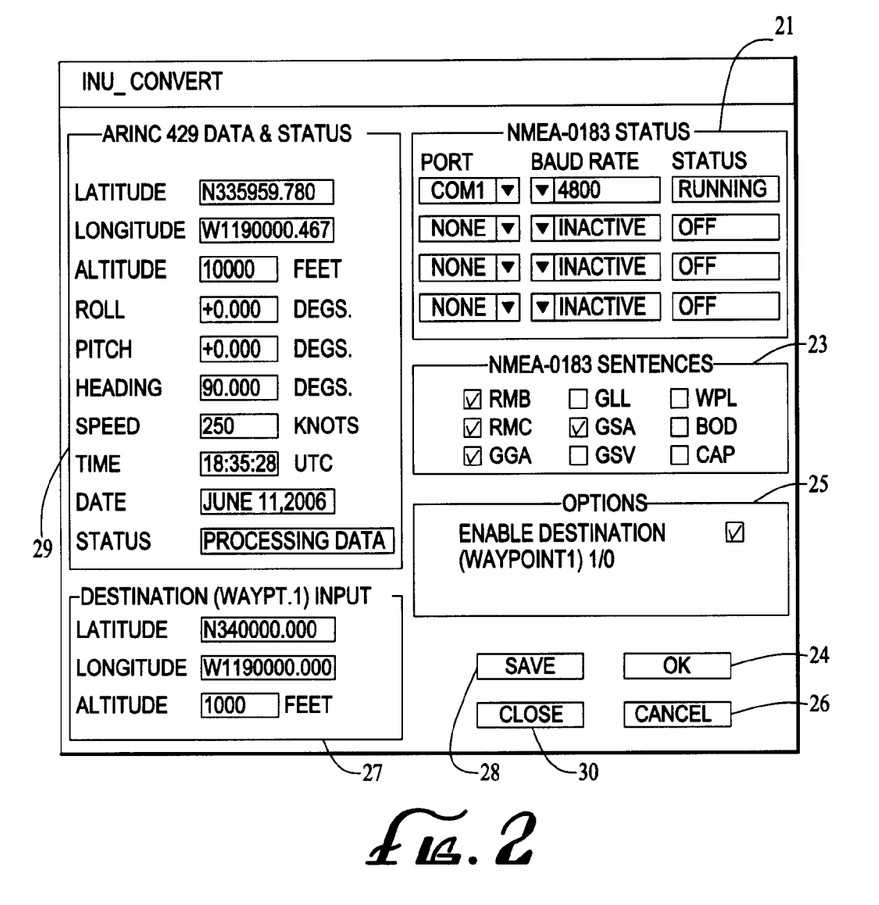
FIG. 2 is a computer generated display of the ARINC-429 data and status and the status of the NMEA-0183 interface.
Figure 3:
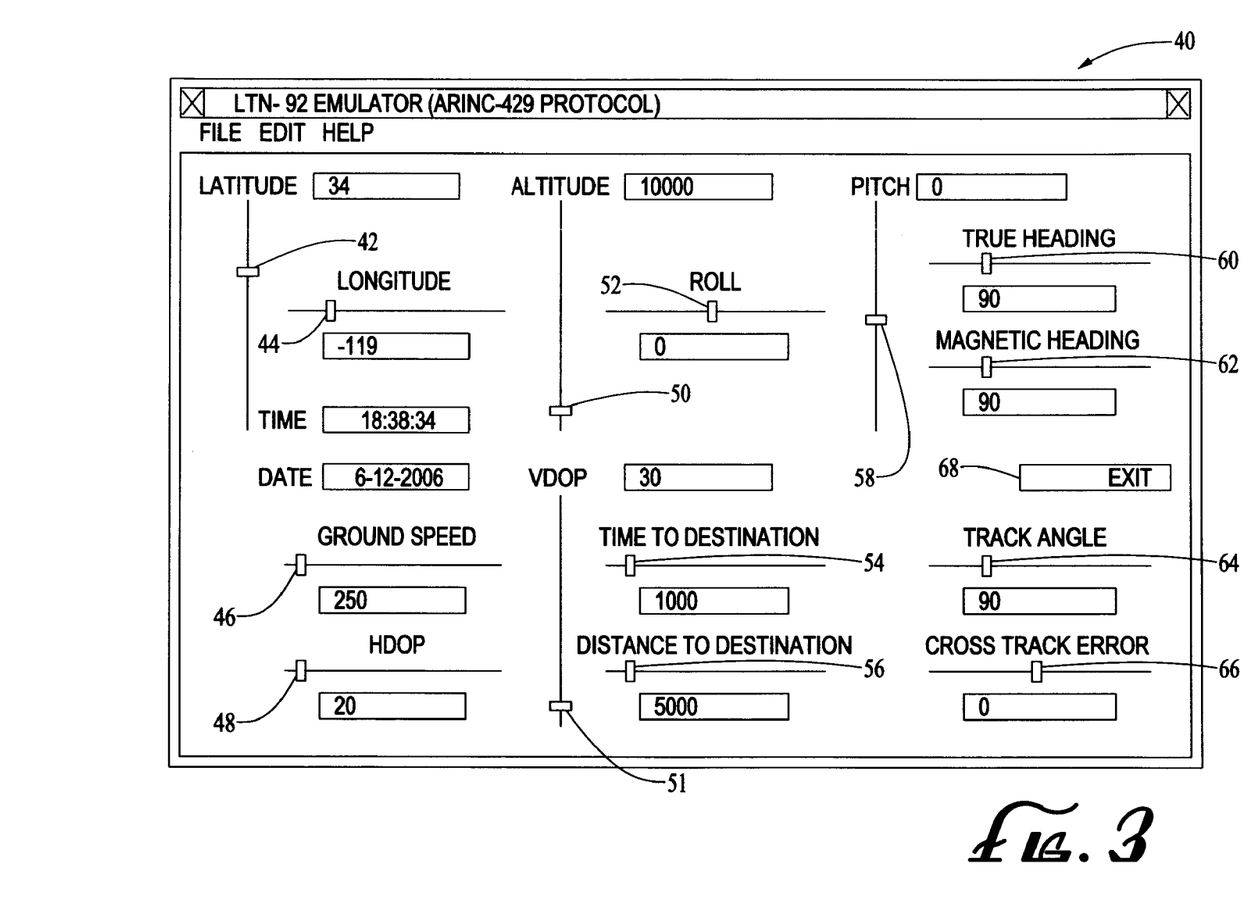
FIG. 3 is a computer generated display screen which allows the user to simulate ARINC-429 data for the purpose of bench testing the protocol converter illustrated in FIG. 1.

Referring to FIGS. 1, 2 and 3, the emulator comprising the present invention is designed for bench testing a protocol converter which translates the ARINC-429 protocol output of a Litton LTN-92 Inertial Navigation System (INS) to the National Marine Electronics Association 0183 (NMEA-0183) protocol. The emulator includes a computer software program which allows a user to select values for the various parameters illustrated in the display screen 21 of FIG. 2. These parameters simulate ARINC-429 data for the purpose of bench testing the protocol converter prior to its installation on a P-3 aircraft.

The computer software program comprising the emulator is loaded onto a general purpose computer 20 which uses Windows 2000 or Windows XP as its operating system. When the computer software starts running an applications window 40 (FIG. 3) opens which allows the user to set the various parameters output by the Inertial Navigation System including aircraft latitude, longitude and altitude as well as pitch, roll and ground speed. This data is also displayed via an ARINC-429 DATA & STATUS display 29 which is illustrated in FIG. 2.

Referring to FIG. 3, applications window 40 has multiple slider controls which allow adjustment of ARINC-429 data normally provided to the protocol converter by the Litton LTN-92 Inertial Navigation System when the P-3 aircraft is airborne and the Litton LTN-92 Inertial Navigation System is operational. Edit control boxes are also included adjacent to the slider controls to provide a visual display of the values set by the user. The time and data edit boxes can not be adjusted by the user.

The ARINC-429 simulated data displayed in the edit control boxes of applications window 40 is also supplied to the ARINC-429 interface board within general purpose computer 20 for processing.

The slider control 42 for latitude adjustment allows the user to adjust the latitude from −90° to +90° which is the earth's latitude range. Similarly, slider control 44 for longitude adjustment allows the user to adjust the longitude from −180° to +180° which is the earth's longitude range.

Slider control 46 allows the user to adjust aircraft ground speed with the aircraft speed being represented in knots. Slider control 48 allows the user to adjust horizontal dilution of precision (HDOP) which is the horizontal accuracy of GPS data supplied to the Litton LTN-92 Inertial Navigation System. Slider control 51 allows the user to adjust vertical dilution of precision (VDOP) which is the vertical accuracy of GPS data supplied to the Litton LTN-92 Inertial Navigation System.

It should be noted that the Litton LTN-92 Inertial Navigation System outputs both HDOP and VDOP information and the values depicted in FIG. 3 (HDOP=20, VDOP=30) are typical values output by the Inertial Navigation System on board the P-3 aircraft.

Slider control 50 allows the user to adjust aircraft altitude from approximately −500 feet to approximately 90,000 feet. Slider control 52 allows the user to adjust aircraft roll from −180° to +180°. Slider control 58 allows the user to adjust aircraft pitch from −90° to +90°. In FIG. 3 both roll and pitch are set at zero which indicates that the aircraft is flying level and is right side up.

Slider control 66 allows the user to adjust the true heading of the aircraft from 0° to 360°. As shown in FIG. 3, the true heading for the aircraft is set at 90°. Slider control 62 allows the user to adjust the magnetic heading of the aircraft from 0° to 360°. As shown in FIG. 3, the magnetic heading for the aircraft is set at 90°. The true heading is the heading to true north, while magnetic heading is the heading provided by a magnetic compass.

Slider control 54 allows the user to adjust the aircraft's travel time to a selected destination and is provided in seconds. Slider control 56 allows the user to adjust the aircraft's distance to the selected destination and is provided in nautical miles.

Slider control 64 allows the user to adjust the track angle for the aircraft and as shown in FIG. 3 is set at 90°. Slider control 66 allows the user to adjust the cross track error for the aircraft and as shown in FIG. 3 is set at 0°. Track angle is the angular direction of travel to the destination. For example, if the true bearing from the aircraft to the destination is 90°, then the track angle is 90°. Cross track error is the distance normal to the direction of travel as the aircraft passes the destination point and the cross track error is provided in nautical miles.

The slider controls 42, 44, 46, 48, 50, 51, 52, 54, 56, 58, 60, 62, 64 and 66 are adjusted by placing the mouse printer appearing on applications window 40 over the slider control 42, 44, 46, 48, 50, 51, 52, 54, 56, 58, 60, 62, 64 or 66 to be adjusted and using the computer's mouse control to move the selected slider control. When the computer's mouse control is released, the position, velocity and direction data as shown in FIG. 3 is entered into computer 20 (FIG. 1). Applications window 40 also has an exit button 68 which exits the computer software program. The FILE drop down menu located in the upper left hand corner of applications window 40 also has an exit function associated with it which allows the user to exit the program.

Figure 4:
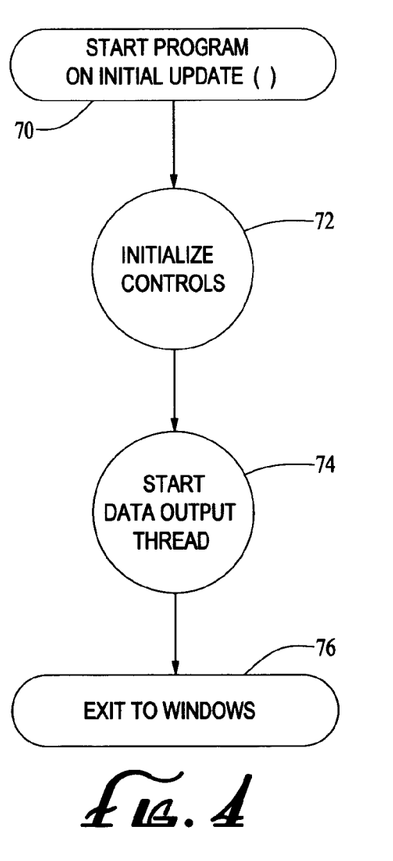
FIG. 4 is a flow chart for the Start Program routine for the computer software program which allows the user to simulate ARINC-429 data for the purpose of bench testing the protocol converter illustrated in FIG. 1.

Referring to FIG. 4, the computer software program is an object orientated program written in Visual C++. The programming language utilizes the standard Microsoft foundation classes. The construction of the program was initiated using the Microsoft foundation class Application Wizard.

The program is implemented using a single document or a single window. The program does not require data base support or compound document support. The program is implemented using 3D controls and the Microsoft foundation class library is used as a Dynamic Linked Library. The base class used for the application is the Form View Class.

The LTN-92 Inertial Navigation System Emulator files generated by the Applications Wizard include ArincTest.cpp, ArincTest.h, ArincTestDoc.cpp, ArincTestDoc.h, ArincTestView.cpp, ArincTestView.h, MainForm.cpp and MainForm.h. ArincTest.cpp defines the class behaviors for the application. ArincTestDoc.cpp is an implementation of the CArincTestDoc class. ArincTestView.cpp is an implementation of the CArincTestView class. MainForm.cpp is an implementation of the CMainForm Class.

The customized application specific code includes the ArincTest.cpp file which was modified to display an application title. The ArincTestView.cpp file contains application specific software to establish and initialize controls such as the slider functions and the edit control boxes on the applications window 40 (FIG. 3). The ArincTestView.cpp file updates data in response to user actions such as changing a parameter by changing the position of a slider control using the mouse. In addition, the ArincTestView.cpp file establishes and executes a data output thread. The ARINC-429 data is transferred to the ARINC-429 interface board.

Figure 5:
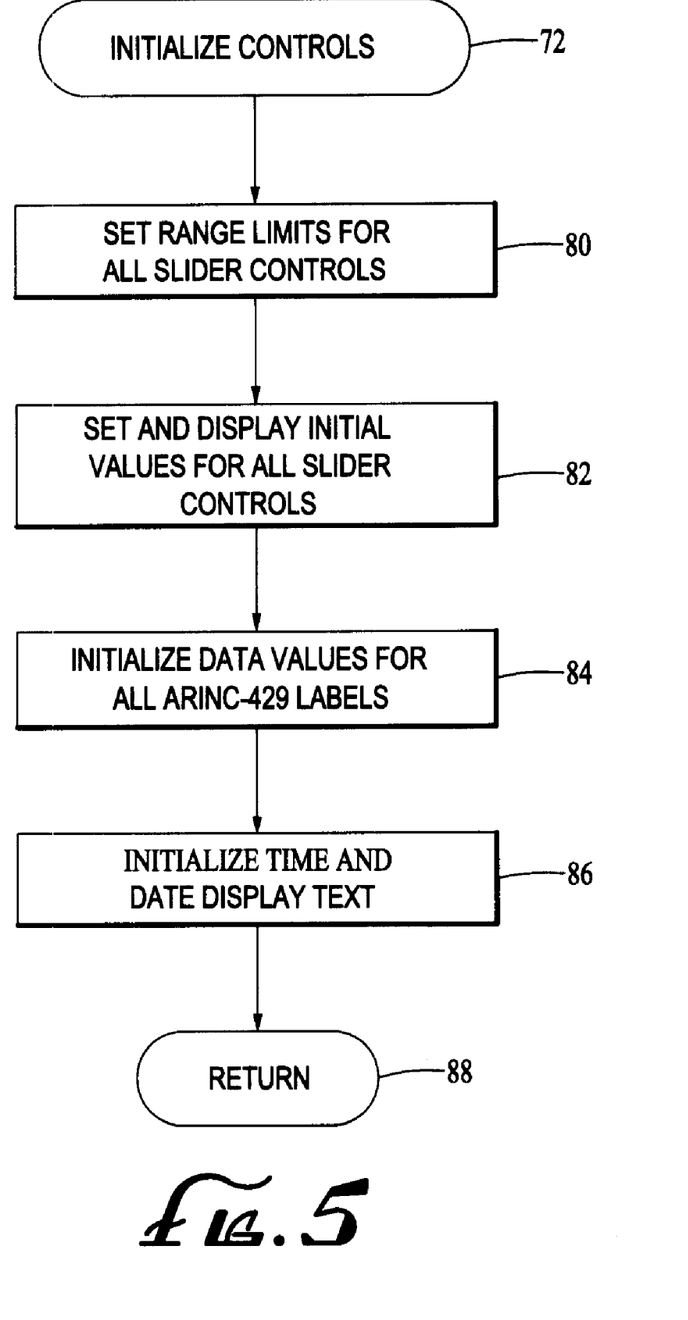
FIG. 5 is a flow chart for the Initialize Controls routine for the computer software program of FIG. 4.

Referring to FIGS. 4 and 5, program step 70 starts the computer software which bench test the ARINC-429 interface board and protocol converter software. During program step 72, the software enters the initialize controls routine. Program step 80 sets the range limits for the slider controls on applications window 40 (FIG. 3). Program step 82 sets and displays initial values for the slider controls 42, 44, 46, 48, 50, 51, 52, 54, 56, 58, 60, 62, 64 and 66. The values illustrated in FIG. 3 are the initial values. Thus, the initial value for latitude is 34°, the initial vale for longitude is −119°, and the initial value for altitude is 10000 feet.

Program step 84 initializes the data values for all ARINC-429 labels. An array contains the values at which the slider controls 42, 44, 46, 48, 50, 51, 52, 54, 56, 58, 60, 62, 64 and 66 are set. This array has all the ARINC-429 data output by the emulator. ARINC-429 data is output with a tag appended onto the data, with the tag being referred to as a label.

Each label and its associated ARINC-429 data comprises 32 bits. The label comprises the least significant eight bits of each 32 bit word, data occupies the remaining bits of each 32 bit word and the most significant bit of each 32 bit word is a parity bit.

The mouse is used to manipulate the slider controls 42, 44, 46, 48, 50, 51, 52, 54, 56, 58, 60, 62, 64 and 66 on the applications window 40. When the user releases a slider control by releasing the mouse button, an action occurs within the program indicating that user input is being provided. The data value for the slider control being released by the user is read off of the slider control, written into the array of ARINC-429 data values and supplied to the appropriate edit control box for viewing by the user.

Program step 86 initializes time and date display text which is depicted in FIG. 3. The computer's time and date information is used to initialize the time and display in applications window 40. Program step 88 returns the routine to the start program routine of FIG. 5.

Figure 6:
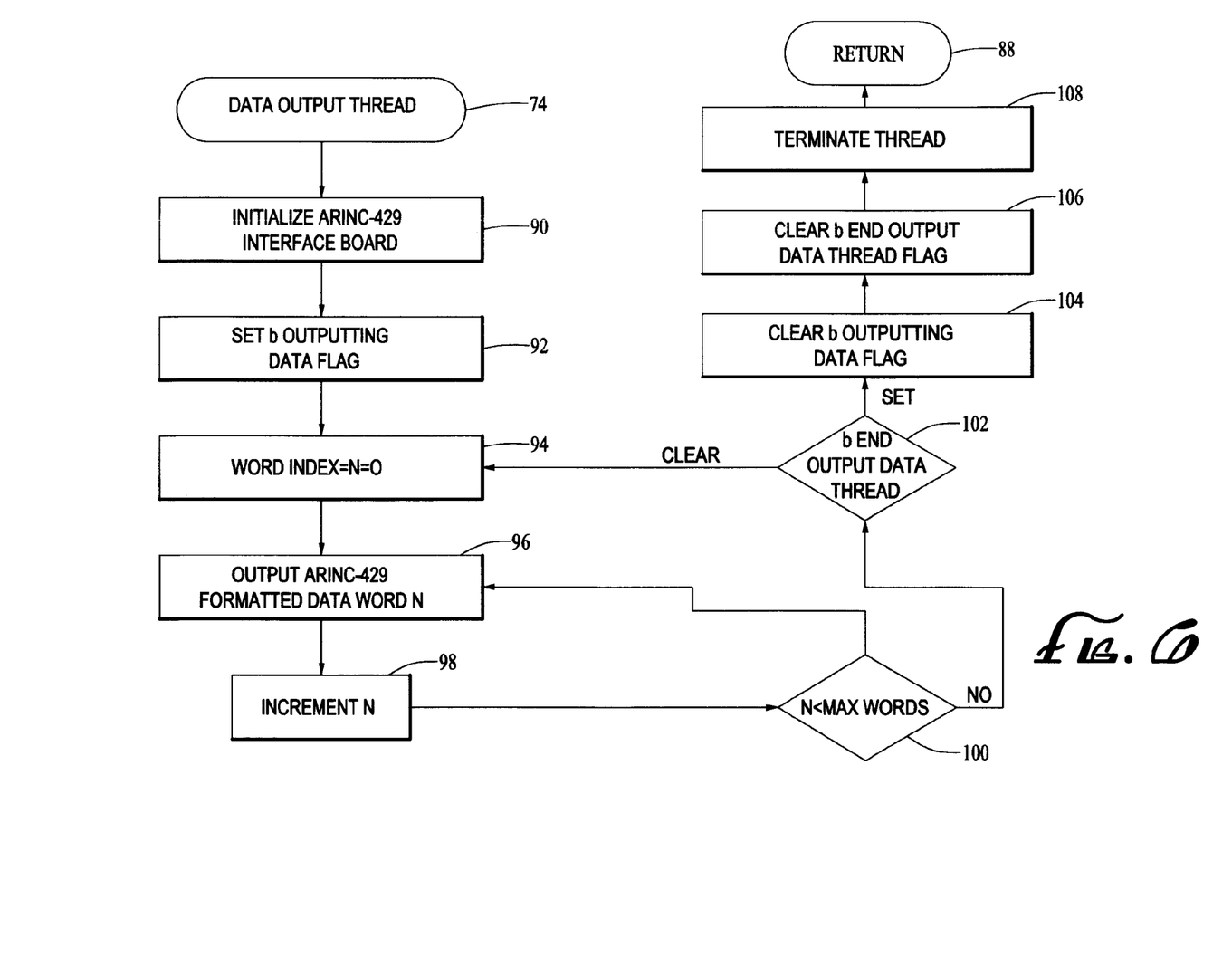
FIG. 6 is a flow chart for the Data Output Thread routine for the computer software program of FIG. 4.

Referring to FIG. 6, program step 74 starts the data output routine which generates the ARINC-429 data simulating the position, direction, and velocity data output by the Litton LTN-92 Inertial Navigation System, used on the P-3 aircraft Program step 90 initializes the ARINC-429 interface board within computer 20. An outputting data flag is set to one in program step 92 which indicates that the computer software is outputting ARINC-429 data to the ARINC-429 interface board.

Program step 94 initializes an index value N to zero. The program steps through an array of ARINC-429 words which are then output to the ARINC-429 interface board. Each parameter is output as a single word with each word having 32 bits. For example, latitude of the P-3 aircraft is output as a single 32 bit word, longitude of the P-3 aircraft is output as another 32 bit word and altitude of the P-3 aircraft is output as still another 32 bit word.

The software establishes a loop consisting of program steps 96, 98, and 100 for outputting each of ARINC-429 32 bit words to the ARINC-429 interface board within computer 20. Program step 96 outputs the ARINC-429 Formatted Data Word N. Latitude of the P-3 aircraft is the first 32 bit word that is output by the software and N is zero. Program step 98 increments N for the next 32 bit word in the sequence which is the longitude of the P-3 aircraft. Program step determines whether N<MAX WORDS. When N equals the maximum number of 32 bit words the software proceeds to program step 102.

Program step 102 determines if the program has been exited by the user. If the program has not been exited by the user the software loops back to program step 96, continuing to output ARINC-429 32 bit data words.

When the user clicks on the exit button 68 or the user utilizes the FILE drop down menu to exit the program the software proceeds to program step 104. Program step 104 clears the outputting data flag which was set to one in program step 92. Program step 106 clears the end output data thread flag which was set by the user when exiting the program. Program step 108 terminates the thread, which is followed by a return (program step 88). This ends the program.

Figure 7:
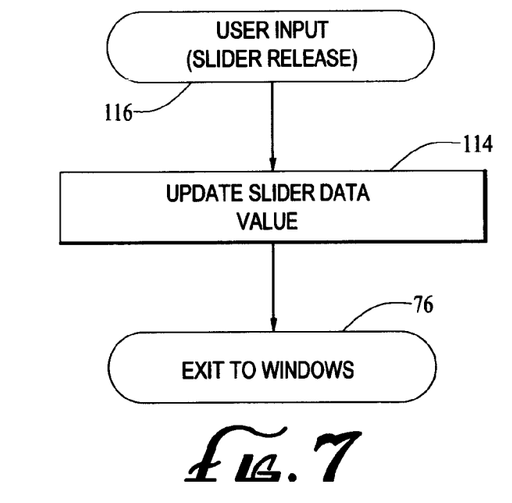
FIG. 7 is a flow chart for the User Input routine for the computer software program of FIG. 4.

Referring to FIG. 7, the flow chart depicts the User Input routine 116 for the computer software program of FIG. 4. Program step 114 updates slider values input by the user. For example, if the user changes the ground speed by adjusting slider 46, the software will update the ground speed value in accordance with the user's adjustment to slider 46, with the update occurring during program step 114. Program step 76 exits the routine to windows.

From the foregoing, it may readily be seen that the present invention comprises a new, unique and exceedingly useful and effective emulator for bench testing a protocol converter which converts ARINC-429 data to NMEA-0183 data and which constitutes a considerable improvement over the known prior art. Many modifications and variations of the present inventions are possible in light of the above teachings. It is therefore to be understood that within the scope of the amended the invention may be practiced otherwise than as specifically described.

What is claimed is:

1. An emulator for simulating ARINC-429 data output by an Inertial Navigation System on board an aircraft, comprising:
   (a) a plurality of slider controls appearing on a display screen, wherein said plurality of slider controls allow a user to adjust emulated values for position, direction and velocity data for said aircraft which is normally output by the inertial navigation system on board said aircraft;
   (b) a computer having computer software for controlling handling and interpretation of the emulated values for said position, direction and velocity data for said aircraft;
   (c) said computer software setting range limits for said slider controls, providing initial values for said position, direction and velocity data for said aircraft, and initializing time and date display text
   (d) said display screen displaying the initial values for said position, direction and velocity data for said aircraft and said time and data display text;
   (e) said computer software, in response to adjustments of said slider controls by said user, generating the emulated values for said position, direction and velocity data;
   (f) said computer software generating a data output thread comprising ARINC-429 data which has the emulated values for said position, direction, and velocity data included therein; and
   (g) said computer software initializing an interface board within said computer, wherein the interface board within said computer receives the data output thread generated by said computer software; and
   (h) said computer software, after initializing said interface board, outputting the data output thread generated by said computer software to said interface board within said computer.

2. The emulator of claim 1 further comprising an exit button appearing on said display screen, wherein said user exits said computer software by engaging the exit button appearing on said display screen.

3. The emulator of claim 1 wherein the emulated values for said position, direction, and velocity data comprise 32-bit data words written in an ARINC-429 data format.

4. The emulator of claim 3 wherein each of said 32-bit data words includes a label which consist of eight least significant bits of each 32-bit data word.

5. The emulator of claim 4 wherein twenty three bits of each of said 32-bit words comprise said position, direction, and velocity data and a most significant bit is a parity bit for each 32-bit data word.

6. The emulator of claim 1 wherein said position, direction, and velocity data comprises latitude, longitude, altitude, roll, pitch, and ground speed for said aircraft which said user provides by adjusting said slider controls.

7. The emulator of claim 1 wherein said user enters a travel time to a destination selected by said user and a distance to said destination by adjusting a first slider control of said plurality of slider controls to set the time to said destination and a second slider control of said plurality of slider controls to set the distance to said destination, wherein the travel time to said destination and the distance to said destination set by said user appear on said display screen.

8. The emulator of claim 7 wherein said user enters a true heading for said aircraft by adjusting a third slider control of said plurality of slider controls to set the true heading for said aircraft within a range of 0° to 360°.

9. The emulator of claim 8 wherein said user by adjusting a fourth slider control of said plurality of slider controls to set the magnetic heading for said aircraft within a range of 0° to 360°.

10. A method for emulating an inertial navigation unit used on board an aircraft comprising the steps of:
   (a) setting range limits for a plurality of slider controls appearing on a display screen, wherein said slider controls allow a user to adjust emulated values for position, direction and velocity data for said aircraft which is normally output by the inertial navigation system on board said aircraft;

(b) setting initial values for each of said slider controls;

(c) displaying said initial values set for each of said slider controls on said display screen for viewing by said user;

(d) initializing time and date display text which is displayed on said display screen;

(e) providing a computer which has computer software for generating the emulated values for said position, direction and velocity data in response to adjustments of said slider controls by said user;

(f) generating a data output thread comprising formatted data which has the emulated values for said position, direction, and velocity data included therein, wherein said data output thread is generated by the computer software for said computer;

(g) initializing an interface board within said computer, wherein the interface board within said computer receives the data output thread generated by said computer software;

(h) outputting the data output thread generated by said computer software to said interface board within said computer.

11. The method of claim 10 further comprising the step of entering a travel time for said aircraft to a destination selected by said user wherein said user enters said travel time to said destination by adjusting a first slider control to set the time to said destination.

12. The method of claim 11 further comprising the step of entering a distance for said aircraft to travel to said destination, wherein said user enters the distance to said destination by adjusting a second slider control to set the distance to said destination.

13. The method of claim 12 further comprising the step of entering a true heading for said aircraft wherein said user enters the true heading for said aircraft by adjusting a third slider control to set the true heading for said aircraft within a range of 0° to 360°.

14. The method of claim 13 further comprising the step of entering a magnetic heading for said aircraft wherein said user enters the magnetic heading for said aircraft by adjusting a fourth slider control to set the magnetic heading for said aircraft within a range of 0° C. to 360°.

15. The method of claim 10 wherein said position, direction, and velocity data comprises latitude, longitude, altitude, roll, pitch, and ground speed for said aircraft which said user provides by adjusting said slider controls.

16. A method for emulating an inertial navigation unit used on board an aircraft comprising the steps of:

(a) setting range limits for a plurality of slider controls appearing on a display screen, wherein said slider controls allow a user to adjust emulated values for position, direction and velocity data for said aircraft which is normally output by the inertial navigation system on board said aircraft;

(b) setting initial values for each of said slider controls;

(c) displaying said initial values set for each of said slider controls on said display screen for viewing by said user;

(d) initializing time and date display text which is displayed on said display screen;

(e) providing a computer which has computer software for generating the emulated values for said position, direction and velocity data in response to adjustments of said slider controls by said user;

(f) generating a data output thread comprising 32-bit data words written in an ARINC-429 data format, wherein each of said 32-bit data words includes a label consisting of eight least significant bits, twenty three bits comprising said position, direction, and velocity data and a most significant bit which is a parity bit for said 32-bit word, wherein said data output thread is generated by the computer software for said computer;

(g) initializing an interface board within said computer, wherein the interface board within said computer receives the data output thread generated by said computer software;

(h) outputting the data output thread generated by said computer software to said interface board within said computer; and (i) exiting said computer software to an operating system for said computer, wherein said user exits said computer software by engaging an exit button appearing on said display screen.

17. The method of claim 16 further comprising the step of entering a travel time for said aircraft to a destination selected by said user wherein said user enters said travel time to said destination by adjusting a first slider control to set the time to said destination.

18. The method of claim 17 further comprising the step of entering a distance for said aircraft to travel to said destination, wherein said user enters the distance to said destination by adjusting a second slider control to set the distance to said destination.

19. The method of claim 18 further comprising the step of entering a true heading for said aircraft wherein said user enters the true heading for said aircraft by adjusting a third slider control to set the true heading for said aircraft within a range of 0° to 360°.

20. The method of claim 18 further comprising the step of entering a magnetic heading for said aircraft wherein said user enters the magnetic heading for said aircraft by adjusting a fourth slider control to set the magnetic heading for said aircraft within a range of 0° to 360°.

* * * * *

UNITED STATES PATENT AND TRADEMARK OFFICE
CERTIFICATE OF CORRECTION

PATENT NO. : 7,487,015 B1
APPLICATION NO. : 11/527664
DATED : February 3, 2009
INVENTOR(S) : Christian Lauritz Houlberg

It is certified that error appears in the above-identified patent and that said Letters Patent is hereby corrected as shown below:

Title Page: item (12), should read HOULBERG

Title Page: item (75), should read Christian Lauritz Houlberg, Ventura, CA (US)

Signed and Sealed this

Thirty-first Day of March, 2009

JOHN DOLL
*Acting Director of the United States Patent and Trademark Office*